United States Patent [19]
Cortese et al.

[11] 3,854,202
[45] Dec. 17, 1974

[54] WIRE CUTTER FOR ELECTRICAL USE

[76] Inventors: Gaetano Cortese, Via Ada Negri 9;
Francesco Cortese, Via Vitt. Veneto 34, both of Cormano, Italy

[22] Filed: Oct. 10, 1973

[21] Appl. No.: 405,050

[30] Foreign Application Priority Data
Oct. 13, 1972 Italy.............................. 23390/72[U]

[52] U.S. Cl...................... 30/91.2, 7/5.5, 81/9.5 R
[51] Int. Cl............................................... B21f 13/00
[58] Field of Search.......... 30/90.1, 91.2; 7/5.6, 5.5, 7/5.4, 3 R; 81/9.5 R, 9.5 B

[56] References Cited
UNITED STATES PATENTS

| | | | |
|---|---|---|---|
| 1,107,210 | 8/1914 | Adams | 81/9.5 R |
| 1,222,513 | 4/1917 | Aaron | 81/9.5 R |
| 1,592,142 | 7/1926 | Laubscher | 30/91.2 |
| 1,924,837 | 8/1933 | Crause | 30/90.1 X |
| 2,386,328 | 10/1945 | Rollings | 81/9.5 R |
| 2,407,233 | 9/1946 | Greer et al. | 30/91.2 |
| 2,932,224 | 4/1960 | Peed et al. | 30/91.2 |
| 3,336,666 | 8/1967 | Calkin | 30/91.2 |
| 3,596,541 | 8/1971 | Bieganski | 30/304 |

FOREIGN PATENTS OR APPLICATIONS
891,028  3/1962  Great Britain...................... 30/91.2

*Primary Examiner*—Al Lawrence Smith
*Assistant Examiner*—J. T. Zatarga
*Attorney, Agent, or Firm*—Michael S. Striker

[57] ABSTRACT

A wire-cutting and insulation-stripping tool is adapted to remove a section of predetermined length from the insulating layer surrounding the conductor of a cable, electrical wire and the like, without damaging the conductor and includes two arms, crossed with each other and articulated to one another in the middle. A spring extends between the arms and is operative for maintaining the arms in an open position. The upper ends of the arms are formed with wire-cutting jaws each provided with a cutting edge sliding over the cutting edge of the other wire-cutting jaw. A stripping jaw is mounted on each of said upper ends for displacement thereof, and includes a free end portion extending toward the free end portion of the other stripping jaw and provided with a V-shaped recess cooperating with the recess of the other stripping jaw to sever the wire insulation. An abutment determines the extent of movement of the arms and of the stripping jaws toward one another in dependence on the diameter of the wire to be severed and stripped.

6 Claims, 1 Drawing Figure

PATENTED DEC 17 1974
3,854,202
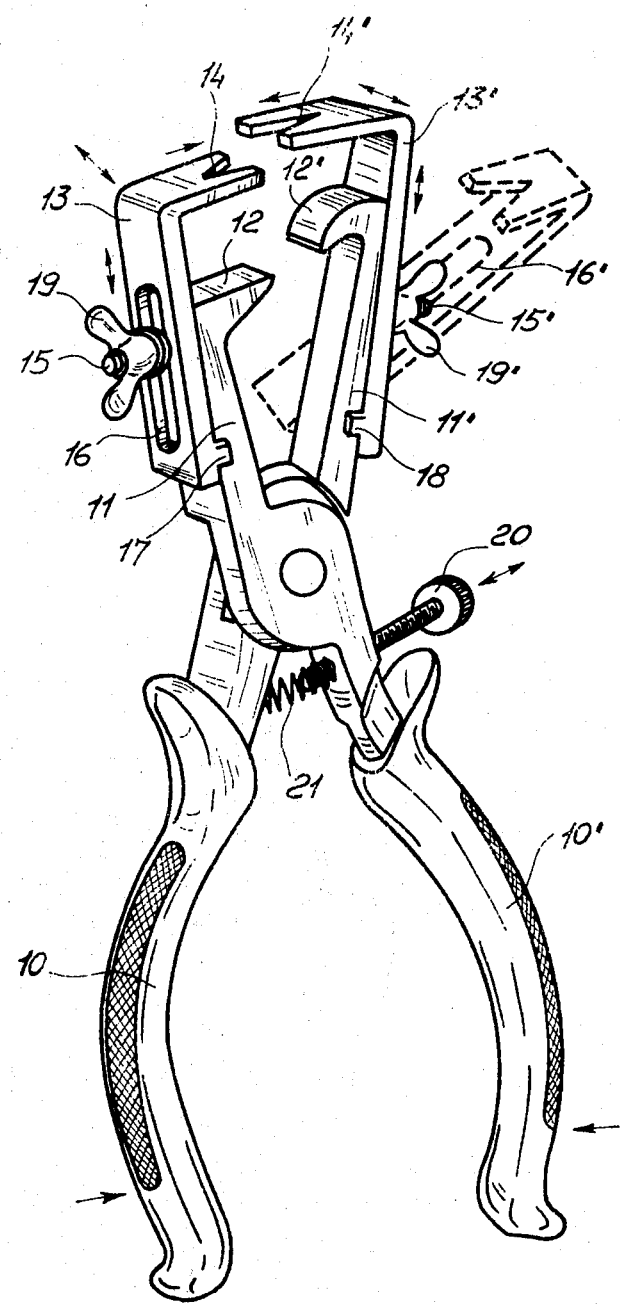

WIRE CUTTER FOR ELECTRICAL USE

This invention relates to a wire cutter for electrical use. More specifically, this invention relates to a wire cutter, utilizable in the electrical field to cut a section of a predetermined length of the insulating layer surrounding the conductor of cables, electrical wires and the like, without damaging the metallic conductive portion.

It is well known that, in order to remove the insulating layer of cables, wires and the like, from the section to be connected, a pair of scissors is normally used. When such a tool is used the inner conductor is often damaged by the blades, which results not only in a reduction of its mechanical strength, but also in reduction the electrically conductive cross-section. Furthermore, the length of the removed section of insulating material cannot be exactly preset as would be desirable, particularly when the wire is to be used in a complex circuit, in which it is necessary that the cable connections be carried out accurately in order to obtain both a reduction in the required space and esthetic appearance.

It is an object of this invention to provide a wire cutter adopted to remove a section of pre-established and variable length of the insulating layer on cables, electrical wires and the like, without damaging the inner conductor.

This and further objects are attained by the wire cutter according to the present invention, which includes two arms crossed with each other and articulated to one another in the middle, maintained in an open position by a suitable spring-loaded means placed between the arms. One end of these arms serves as a handgrip, whilst the other end is provided with a wire-cutting jaw provided with a cutting edge, facing the opposite wire-cutting jaw, thus serving as nippers. On the upper part of the arms there is mounted a longitudinally slidable stripping jaw, guided by a pair of side lugs integral therewith, and arrestable in a predetermined position.

The end of each stripping jaw has a free end portion extending transversely to the respective arm and provided with a recess having a V-shaped configuration and provided with cutting edges.

The closing angle of the two arms of the wire cutter may be chosen by providing and adjusting an abutment between the two handgrips.

By suitably adjusting the abutment, it is obtained that the two V-shaped cavities intersect as necessary to perimetrally cut the insulating material of the cable without damaging the inner conductor.

The two wire-cutting jaws, provided with the cutting edges effect the cutting of the conductor to the required length and a section of the insulation is removed the length of which corresponds to the distance between the wire-cutting and stripping jaws.

These and further characteristic features of a constructional and functional nature of the wire cutter according to the present invention will be better understood from the following detailed description taken in conjunction with the single FIGURE on the accompanying drawing, representing a perspective side view of a preferred embodiment of the wire cutter according to the invention, not to be understood in a limiting sense.

Referring now particularly to the numeral symbols given in the FIGURE, the wire cutter according to this invention includes two arms crossed with each other and articulated to one another in the middle, the lower ends 10 and 10' of which, provided with suitable insulation, serve as a handgrip, whilst the upper ends 11 and 11' are formed with two wire-cutting jaws, 12–12', which extend transversely of the respective arms and are provided with cutting edges. The two cutting edges slide one over the other and form together straight cut nippers, adapted to cut the metal conductor. On the two upper ends 11 and 11' there are mounted for longitudinal displacement two stripping jaws 13 and 13', each having a transversely extending free end portion and provided with a recess, 14 and 14', respectively, of a V-shaped configuration, the inner sides bounding the recess having cutting edges. Threaded projections 15 and 15' are formed integrally with the upper end 11 and 11' and elongated slots 16 and 16', are provided in the stripping jaws 13 and 13', into which the projections 15 and 15' extend for mounting the stripping jaws 13 and 13' for displacement longitudinally of the upper end portions 11 and 11'. A pair of lugs 17 and 18 is provided on each of the stripping jaws 13 and 13' and engages the sides of the upper ends 11 and 11' for restraining the stripping jaws 13 and 13' to displacement longitudinally of the upper ends 11 and 11'.

The stripping jaws 13 and 13' referred to above may be positioned and arrested at the chosen point relative to the upper ends 11 and 11' via wing nuts 19 and 19' or equivalent fasteners, threaded on the threaded projections 15 and 15'. The stripping jaws 13 and 13' may also be brought into a perpendicular position relative to the upper ends 11 and 11' by loosening the fasteners 19 and 19' in order to disengage the lugs 17–18 and arresting the clamping jaws 13 and 13' in a deflected position; in this manner, the cutting edges 12–12' are exposed, so that the wire cutter may be used as conventional nippers.

Into the lower portion of one of the handgrips 10 and 10', there may be screwed a threaded pin 20. The threaded pin 20 serves as an abutment for the arms of the wire cutter, so that the angulation closing angular position of the upper ends 11–11' and, consequently, also of the stripping jaws 13 and 13' may be adjusted in dependence on the diameter of the cable to be handled, thus avoiding the danger that the cutting edges 14–14' might damage the conductor.

Furthermore, the length of the insulating section to be removed may be adjusted at will by deflecting the distance between the cutting edges 14–14' of the stripping jaws 13, 13' and the cutting edges of the wire-cutting jaws 12–12'. Between the handgrips 10–10', there is inserted and interposed at the end of the pin 20 a spring 21, adapted to maintain the arms of the wire cutter in an open position.

From the foregoing description, there may be seen the functional character and the practical and easy application of the wire cutter according to the present invention. It is, of course, understood that several changes and modifications may be introduced in the invention upon its putting into effect so far as the shape and the dimensions of the instant wire cutter are concerned, without departing from the scope of the invention.

We claim:

1. A combined wire-cutting and insulation-stripping tool comprising, in combination, a pair of elongated arms having spaced end portions and articulated to one another intermediate said end portions; biasing means extending between said arms and urging the same away from one another; a pair of wire-cutting jaws rigidly connected to the associated end portions of said arms and extending transversely thereto toward one another and adapted to overlap each other, each of said wire-cutting jaws having a cutting edge adapted to cooperate with the cutting edge of the other jaw for engaging and severing a wire introduced therebetween; a pair of stripping jaws connected to said associated end portions and adjustable longitudinally thereof so as to select the distance between said wire-cutting and stripping jaws, each of said stripping jaws having a free end portion extending transversely of the respective arm toward the free end portion of the other stripping jaw and being provided with a V-shaped recess, said V-shaped recesses being adapted to cooperate with one another to sever the insulation of the wire; and an abutment for adjusting the extent of movement of said arms and said stripping jaws toward one another in dependence on the diameter of the wire to be severed and stripped.

2. A tool as defined in claim 1, each of said stripping jaws further comprising an elongated portion contacting one side of the respective one of said associated end portions and provided with a longitudinally extending slot; and further comprising a threaded projection connected to said one side and extending transversely of said respective end portion and into said slot; and a nut threaded on said projection and adapted to engage said elongated portion so as to retain said stripping jaw in a predetermined position.

3. A tool as defined in claim 1, each of said stripping jaws further comprising an elongated portion contacting one side of the respective one of said associated end portions, and a pair of lugs projecting from said elongated portion for restraining said stripping jaw to movement longitudinally of said one end portion.

4. A tool as defined in claim 1, and further comprising a sheath of insulating material at least partially surrounding each of the other end portions of said arms.

5. A tool as defined in claim 1, wherein said abutment comprises a screw threadedly connected to one of said arms and having a portion extending toward the other arm.

6. A tool as defined in claim 5, wherein said biasing means includes a spring having one end portion surrounding said portion of said screw and another end portion abutting against said other arm.

* * * * *